US011614896B2

United States Patent
Benisty et al.

(10) Patent No.: US 11,614,896 B2
(45) Date of Patent: Mar. 28, 2023

(54) UFS OUT OF ORDER HINT GENERATION

(71) Applicant: Western Digital Technologies, Inc., San Jose, CA (US)

(72) Inventors: Shay Benisty, Beer Sheva (IL); Amir Segev, Meiter (IL)

(73) Assignee: Western Digital Technologies, Inc., San Jose, CA (US)

( * ) Notice: Subject to any disclaimer, the term of this patent is extended or adjusted under 35 U.S.C. 154(b) by 91 days.

(21) Appl. No.: 17/396,243

(22) Filed: Aug. 6, 2021

(65) Prior Publication Data
US 2023/0044866 A1 Feb. 9, 2023

(51) Int. Cl.
*G06F 3/06* (2006.01)

(52) U.S. Cl.
CPC ............ *G06F 3/0659* (2013.01); *G06F 3/061* (2013.01); *G06F 3/0604* (2013.01); *G06F 3/0611* (2013.01); *G06F 3/0613* (2013.01); *G06F 3/0619* (2013.01); *G06F 3/0655* (2013.01); *G06F 3/0656* (2013.01); *G06F 3/0661* (2013.01); *G06F 3/0679* (2013.01)

(58) Field of Classification Search
CPC ...... G06F 3/061; G06F 3/0611; G06F 3/0613; G06F 3/0619; G06F 3/0655; G06F 3/0656; G06F 3/0659; G06F 3/0679; G06F 12/0246
See application file for complete search history.

(56) References Cited

U.S. PATENT DOCUMENTS

| | | | |
|---|---|---|---|
| 10,268,584 B2 | 4/2019 | Hahn | |
| 10,795,604 B2 | 10/2020 | Silbermintz et al. | |
| 10,884,920 B2 | 1/2021 | Benisty et al. | |
| 11,132,143 B2 | 9/2021 | Jang et al. | |
| 11,513,890 B1 * | 11/2022 | Mekhanik | G06F 11/106 |
| 2017/0123898 A1 * | 5/2017 | Ryabinin | G06F 3/0679 |
| 2017/0269991 A1 * | 9/2017 | Bazarsky | G06F 3/064 |
| 2020/0304142 A1 * | 9/2020 | Nakanishi | H03M 7/3059 |
| 2021/0081316 A1 * | 3/2021 | Muthiah | G06F 3/0616 |
| 2021/0216458 A1 | 7/2021 | Kang | |

FOREIGN PATENT DOCUMENTS

DE 102022102102 A1 * 5/2021

* cited by examiner

*Primary Examiner* — Paul M Knight
(74) *Attorney, Agent, or Firm* — Patterson + Sheridan, LLP; Steven H. VerSteeg

(57) ABSTRACT

A data storage device includes a memory device and a controller coupled to the memory device. The controller is configured to interact with a host device using Universal Flash Storage (UFS) interface protocols, provide a hint to the host device, switch between a first mode and a second mode, retrieve the data from the memory device, and deliver the data to the host device. The hint includes an indication of what order data will be received from the data storage device. The order of the data will be in a different order than a requested order after providing the hint.

20 Claims, 7 Drawing Sheets

FIG. 2

| | 0 | | 1 | | 2 | | 3 | |
|---|---|---|---|---|---|---|---|---|
| | xx100010b | | Flags | | LUN | | Task Flag | 250 |
| 4 | IID | Reserved | 5 | Reserved | 6 | Reserved | 7 | Reserved |
| 8 | Total EHS Length (00h) | | 9 | Reserved | 10 | Data Segment Length (MSB) | 11 | (LSB) |
| 12 | (MSB) | | 13 | Data Buffer Offset | 14 | | 15 | (LSB) |
| 16 | (MSB) | | 17 | Data Transfer Count | 18 | | 19 | (LSB) |
| 20 | Reserved \| HintControl 201 | | 21 | HintId 202 | 22 | HintLUN 203 | 23 | HintTaskTag 204 |
| 24 | (MSB) | | 25 | Hint Data Buffer Offset 205 | 26 | | 27 | (LSB) |
| 28 | | | 29 | In Order Hint Count 206 | 30 | | 31 | |
| | Header E2ECRC (Omit if HD=0) | | | | | | | |
| k | Data [0] | | k+1 Data [1] | | k+2 Data [2] | | k+3 Data [3] | |
| | ... | | ... | | ... | | ... | |
| k+Length-4 Data [Length-4] | | | k+Length-3 Data [Length-3] | | k+Length-2 Data [Length-2] | | k+Length-1 Data [Length-1] | |
| | Data E2ECRC (Omit if DD=0) | | | | | | | |

Note 1   k = 32 if HD = 0

DATA IN UPIU (220)

200
230

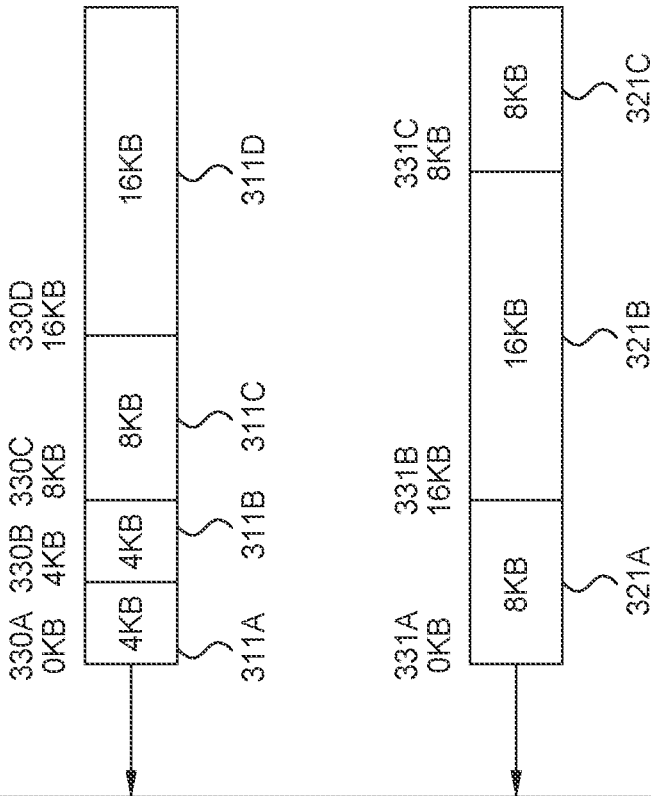
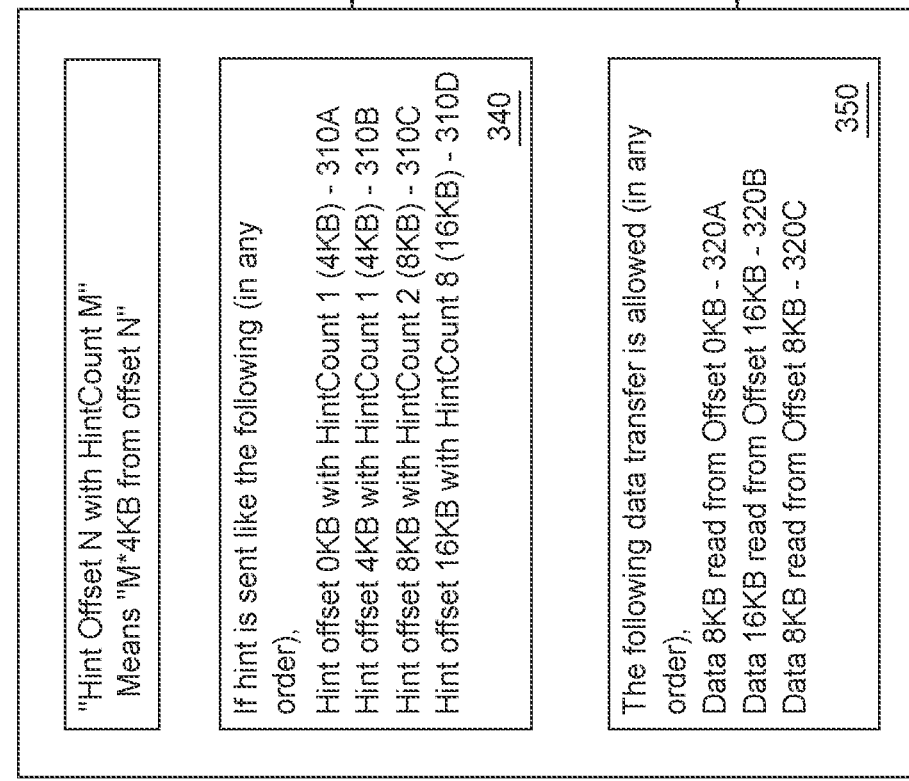
FIG. 3

UFS OUT OF ORDER HINT GENERATION

BACKGROUND OF THE DISCLOSURE

Field of the Disclosure

Embodiments of the present disclosure generally relate to out of order hint generation for a Universal Flash Storage (UFS).

Description of the Related Art

UFS is an advanced, high performance interface designed for computing and mobile systems, such as smartphones and tablets, where power consumption needs to be minimal. The latest UFS interface protocols are optimized for efficient throughput, system performance, and reliability. When using UFS, power consumption is reduced due to the near zero idle power level. When combined with the Mobile Industry Processor Interface (MIPI) power-saving specifications, the data storage device's power consumption is reduced significantly.

UFS standards also adopt the well-known Small Computer System Interface (SCSI) Architecture Model. Command protocols that support multiple simultaneous commands and command queuing features enable highly efficient multi-thread programming. This is a significant difference compared to legacy flash-based memory cards and embedded flash solutions, which can only process individual commands, thereby limiting random read/write access performance.

UFS protocol generally supports in-order data transfers per command. However, in-order data transfers may add extra complexity and size requirements to the data storage device in order execute the in-order data transfers. In order to achieve greater throughput, system performance, and reliability for the UFS interface protocols, a different method of data transfer other than in-order data transfer may be required. For example, a UFS out of order (OOO) data transfer support may allow for greater throughput, system performance, and reliability as the extra complexity and size requirements to support the in-order data transfers may no longer be needed.

Therefore, there is a need for a data storage device that supports OOO hint generation and data transfer.

SUMMARY OF THE DISCLOSURE

The present disclosure generally relates to out of order (OOO) hint generation for a Universal Flash Storage (UFS). A data storage device includes a memory device and a controller coupled to the memory device. The controller is configured to interact with a host device using Universal Flash Storage (UFS) interface protocols, provide a hint to the host device, switch between a first mode and a second mode, retrieve the data from the memory device, and deliver the data to the host device. The hint includes an indication of what order data will be received from the data storage device. The order of the data will be in a different order than a requested order after providing the hint.

In one embodiment, a data storage device includes a memory device and a controller coupled to the memory device. The controller is configured to interact with a host device using UFS interface protocols and to operate in a first mode corresponding to a first bit error rate (BER) and a second mode corresponding to a second BER that is greater than the first BER. The controller is configured to operate in the first mode and provide a hint to the host device. The hint includes an indication of what order data will be received from the data storage device. The order of the data will be a different order than a requested order. After providing the hint, the controller is configured to retrieve the data from the memory device. The controller detects a hint violation due to BER, reorders the data to match the order provided in the hint and delivers the data to the host device. The controller then determines that the BER is greater than a predetermined threshold and switches to operation in the second mode.

In another embodiment, a data storage device includes a memory device and a controller coupled to the memory device. The controller is configured to interact with a host device using UFS interface protocols and to operate in a first mode corresponding to a first bit error rate (BER) and a second mode corresponding to a second BER that is greater than the first BER. The controller is configured to operate in the second mode and retrieve data from the memory device. After retrieving the data, the controller is configured to provide a hint to the host device. The hint includes an indication of what order data will be received from the data storage device. The order of the data will be in a different order than a requested order. The controller is configured to deliver the data to the host device. The controller is also configured to compare a BER for the delivered data to a threshold, determine the BER is less than the threshold, and switch to operation in the first mode.

In another embodiment, a data storage device includes memory means and a controller coupled to the memory means. The controller is configured to interact with a host device using UFS interface protocols. The controller is configured to provide a hint to the host device, switch between a first mode and a second mode, and deliver the data to the host device. The hint includes an indication of what order data will be received from the data storage device. The order of the data will be in a different order than a requested order. The first mode includes providing the hint prior to retrieving the data from the memory means. The second mode includes providing the hint after retrieving the data from the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 2 is an illustration of a UFS packet, according to certain embodiments.

FIG. 3 is a schematic illustration of an example of the out of order (OOO) transfer using the generated hints, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to out of order (OOO) hint generation for a Universal Flash Storage (UFS). A data storage device includes a memory device and a controller coupled to the memory device. The controller is configured to interact with a host device using Universal Flash Storage (UFS) interface protocols, provide a hint to the host device, switch between a first mode and a second mode, retrieve the data from the memory device, and deliver the data to the host device. The hint includes an indication of what order data will be received from the data storage device. The order of the data will be in a different order than a requested order after providing the hint.

Figure 1:
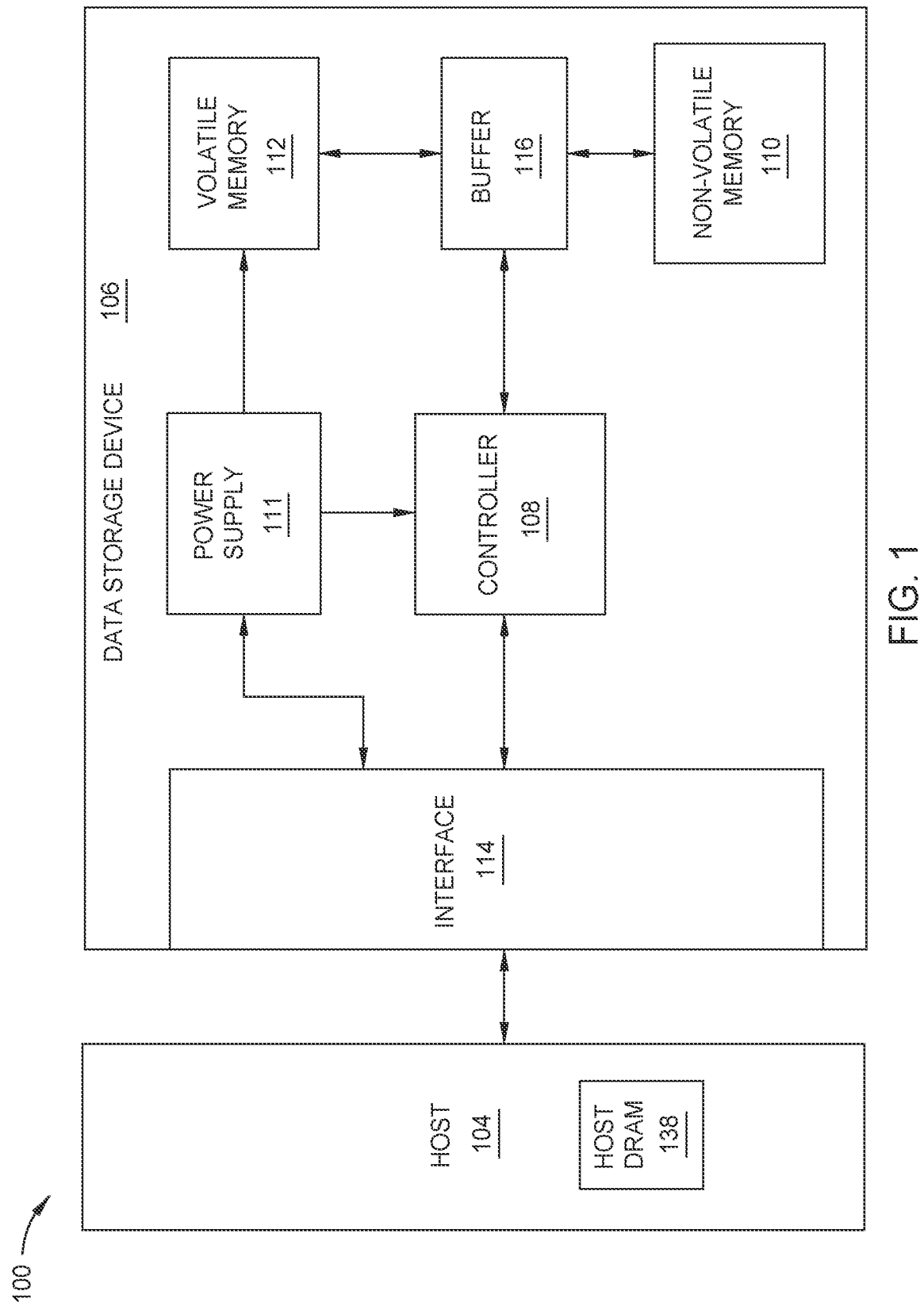
FIG. 1 is a schematic block diagram illustrating a storage system having a data storage device that may function as a data storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

FIG. 2 is an illustration of a UFS packet 200, according to certain embodiments. The UFS packet 200 includes a plurality of fields 220, which includes hint fields 230. Each of the plurality of fields 220 is associated with one or more bit values. The hint fields 230 add support for out of order (OOO) data transfer functionality. The hint fields 230 include a HintControl 201 located in field 20, a HintIID (Hint independent and identically distributed random variable) 202 located in field 21, a HintLUN (Hint Linear Unit number) 203 located in field 22, a HintTaskTag 204 located in field 23, a Hint Data Buffer Offset 205 located in fields 24-27, and an In Order Hint Count 206 located in fields 28-31.

The HintControl 201 indicates the validity of the hint fields 230. When the HintControl 201 is set to "0b," the hint fields 230 are not valid and are expected to be ignored by a controller of a host device, such as the host device 104 of FIG. 1. However, when the HintControl 201 is set to "1b," the hint fields 230 are valid. When the hint fields 230 are not valid, are disabled (e.g., bDataOrdering=00 h or bOutOfOrderDataEn=00 h), or when the hint fields 230 (e.g., HintTaskTag 204, etc.) do not refer to a READ (6), a READ (10), a READ (16), or HPB Read command that request a read of specific logical blocks and transfer of the data to a buffer, the HintControl 201 is set to 0x0 and the hint information is not provided.

HintIID 202 may include a signifier which indicates the field location. Furthermore, HintIID 202 indicates the IID of data in the UFS Protocol information Units (UPIUs) to be transferred by a controller, such as the controller 108 of FIG. 1, to the host device 104. The HintIID 202 field is valid when the HintControl 201 is set to "1b." The HintIID 202 field may be different than IID field.

HintLUN 203 is a field which indicates the LUN of data in the UPIUs that a controller, such as the controller 108 of FIG. 1, will transfer. HintLUN 203 is valid when HintControl 201 is set to "1b." The HintLUN 203 field may be different than the LUN field.

HintTaskTag 204 is a field which indicates the Task Tag of data in the UPIUs. The HintTaskTag 204 field may be different than a TaskTag 250 field located in bit3. The Hint Data Buffer Offset 205 is the field that indicates the Data Buffer Offset in a data in UPIUs that the data storage device 106 will transfer. The HintTaskTag 204 field is valid when HintControl 201 is set to "1b."

In Order Hint Count 206 is a field which indicates the number of 4 KBs that the host device 104 is expected to transfer in order to the initiator starting from the Hint Data Buffer Offset 205. The data storage device 106 may interleave data in UPIUs pertaining to all hints provided by the data storage device 106. The In Order Hint Count 206 is valid when HintControl 201 is set to "1b."

FIG. 3 is a schematic illustration of an example 300 of an out of order (OOO) data transfer using the generated hints, according to certain embodiments. The transfer size of Command hints 340 in this example is 32 KB. Commands hints 340 may be referred to as Command 340 for simplification purposes herein. A data storage device, such as the data storage device 106 of FIG. 1, provides hints to a host device, such as the host device 104 of FIG. 1. In this example, there are four hints (i.e., 310A, 310B, 310C, and 310D). Each hint (i.e., 310A, 310B, 310C, and 310D) defines the order of the data within the chunk of data. Command 340 includes the hints issued to the host device 104.

Each of the hints issued includes two components. These two components include a hint offset 330A, 330B, 330C, 330D, such as the Hint Data Buffer Offset 205 of FIG. 2, and a hint count 311A, 311B, 311C, 311D, such as the In Order Hint Count 206 of FIG. 2. The hint count represents the size of the data transfer. For example, a hint count of a unit size of 1 may be substantially equal to about 4 KB. In the currently depicted embodiment, the first hint 310A includes a hint offset 330A of zero and a hint count 311A of 1 (4 KB). The second hint 310B includes a hint offset 330B of 4 and a hint count 311B of 1 (4 KB). The third hint 310C includes a hint offset 330C of 8 and a hint count 311C of 2 (8 KB). The fourth hint 310D includes a hint offset 330D of 16 and a hint count 311D of 8 (16 KB). Command 340 is able to provide the hints issued 310 to the controller, such as the controller 108 of FIG. 1, in any order.

The data transfer 350 may include transferred data in any order based on the hints issued 310. One embodiment of the data transfer 350 is shown. Each transferred data includes two components. These two components include an offset 331A, 331B, 331C, and 331D and a count 321A, 321B, 321C, and 321D. In the embodiment shown, it can be seen that the first transferred data 320A includes a count 321A of 8 KB and an offset 331A of zero. The first transferred data 320A combines the first two hints, 310A and 310B, from command 340 together. The second transferred data 320B includes a count 321B 16 KB and an offset 331B of 16 KB, which represents the fourth hint 310D of command 340. The last transferred data 320C includes a count 321C and an offset 331C of 8 KB, which represents the third hint 310C of command 340. The previously listed order of transferred data is not intended to be limiting, but to provide an example of a possible embodiment. Thus, the embodiments described are not intended to be restricting in any order.

Figure 4:
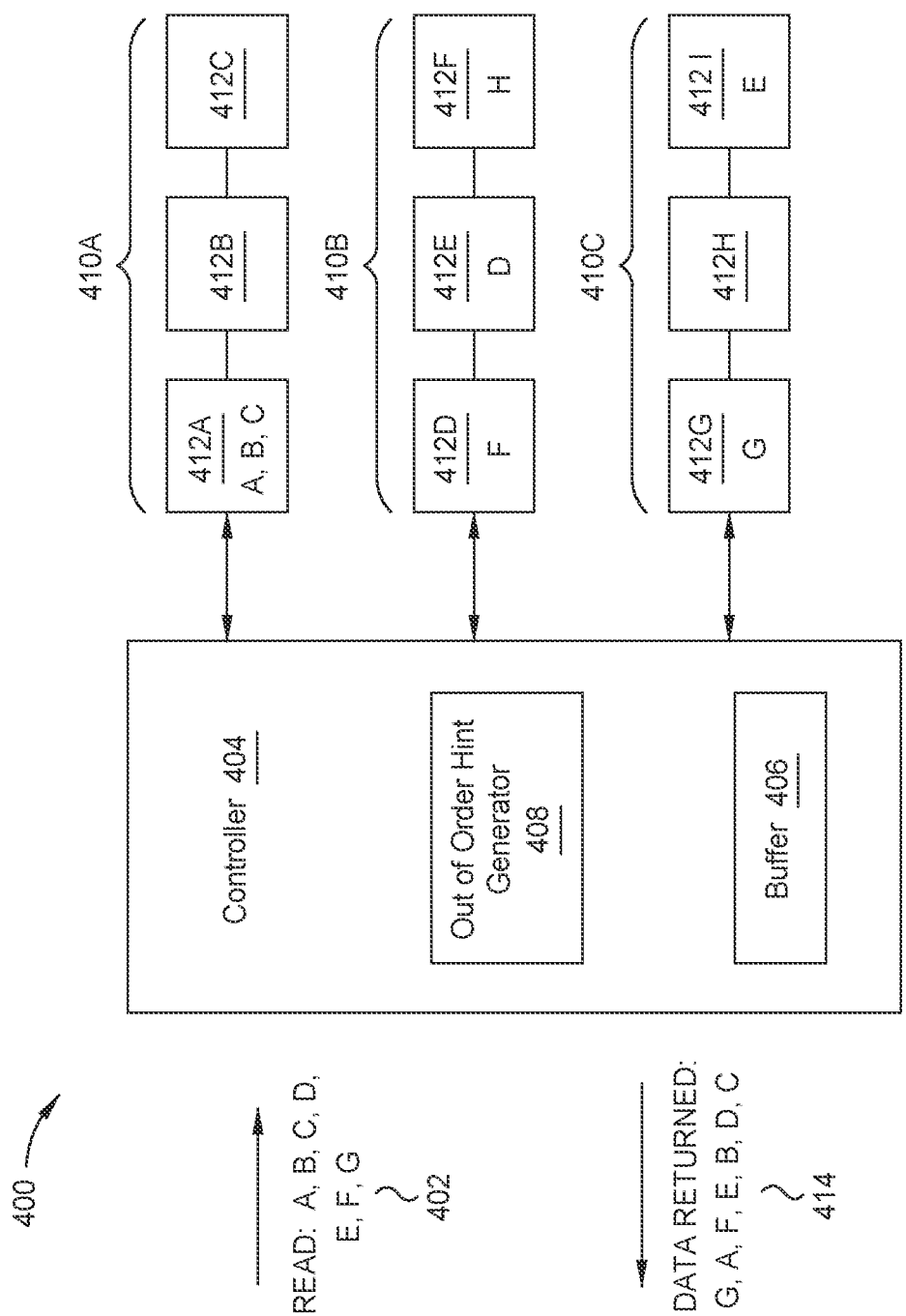
FIG. 4 is a schematic illustration of an OOO data transfer, according to certain embodiments.

FIG. 4 is a schematic illustration 400 of an OOO data transfer, according to certain embodiments. A read command 402 is received by a controller 404. The controller 404 may be the controller 108 of FIG. 1. The controller 404 includes a buffer 406, which may be volatile memory, such as SRAM or DRAM. The buffer 406 may be utilized to store read commands as well as data read from a memory device, such as the NVM 110 of FIG. 1, or in the current embodiment, a plurality of dies 412A-412I. The read command 402 may be a set of sequential read commands. For example, the read command 402 includes read commands in the order of A-G, which corresponds to a respective data A-G located on one or more dies of the plurality of dies 412A-412I.

The controller 404 is coupled to the plurality of dies 412A-412I. It is to be understood that the arrangement and the number of the plurality of dies 412A-412I is not intended to be limiting, but to provide an example of a possible embodiment. Furthermore, the plurality of dies 412A-412I may be arranged into a plurality of parallel die groups 410A-410C. For example, a first parallel die group includes dies 412A-412C, a second parallel die group includes dies 412D-412F, and a third parallel die group 410C includes dies 412G-412I. Each of the plurality of die groups 410A-410C may operate in parallel with each other. For example, when a read command to read data from a first die 412A and a fourth die 412D is received, both data of the first die 412A and the fourth die 412D may be read in parallel. Likewise, when the controller 404 receives a sequential read command from a host device, such as the host device 104 of FIG. 1, dies of parallel die groups of the plurality of parallel die groups 410A-410C may be activated (i.e., read from) in order to receive the read data efficiently.

Because each die of the plurality of die groups 412A-412I may have its own timing (i.e., its own efficiency due to die characteristics), data may be transferred or read back to the controller 404 out of order from the read command. The timing of each die may be based on the current processes of the relevant die. For example, a die may be in an idle state. For example, in order to read from the die in an idle state, the die needs to be moved (i.e., supplied additional power) to "wake up" the die into an active state. In another example, the die may be busy (i.e., currently executing) with an erase operation, a write operation, or in an exception handling state. It is to be understood that the previously listed examples are not intended to be limiting and other examples are contemplated.

For example, dies 412A-412D, 412F, 412G, and 412I may be in an idle state, a fifth die 412E may be handling an erase operation, and an eighth die 412H may be in an exception handling state. When the read commands 402 are received by the controller 404 in the order of A to G, the controller 404 parses and schedules the read commands to the relevant die of the plurality of dies. Rather than waiting for in-order data transfer, the controller 404 may utilize an OOO hint generator 408 to schedule the data transfer in a more efficient manner.

For example, the OOO hint generator 408 may utilize a logical to physical (L2P) table to translate the logical block address (LBA) associated with the relevant read command to a physical block address (PBA) to generate hints, such as the hints issued 310 of FIG. 3. The generated hints are provided to the host device 104, such that the host device 104 may process the hints prior to receiving the data from the controller 404. Thus, when the host device 104 receives the data (i.e., data returned 414), the host device 104 is aware of the out of order data transfer. For example, even though the data was requested in the order of A, B, C, D, E, F, and G, the data is returned 414 is in the order of G, A, F, E, B, D, and C.

Figure 5:
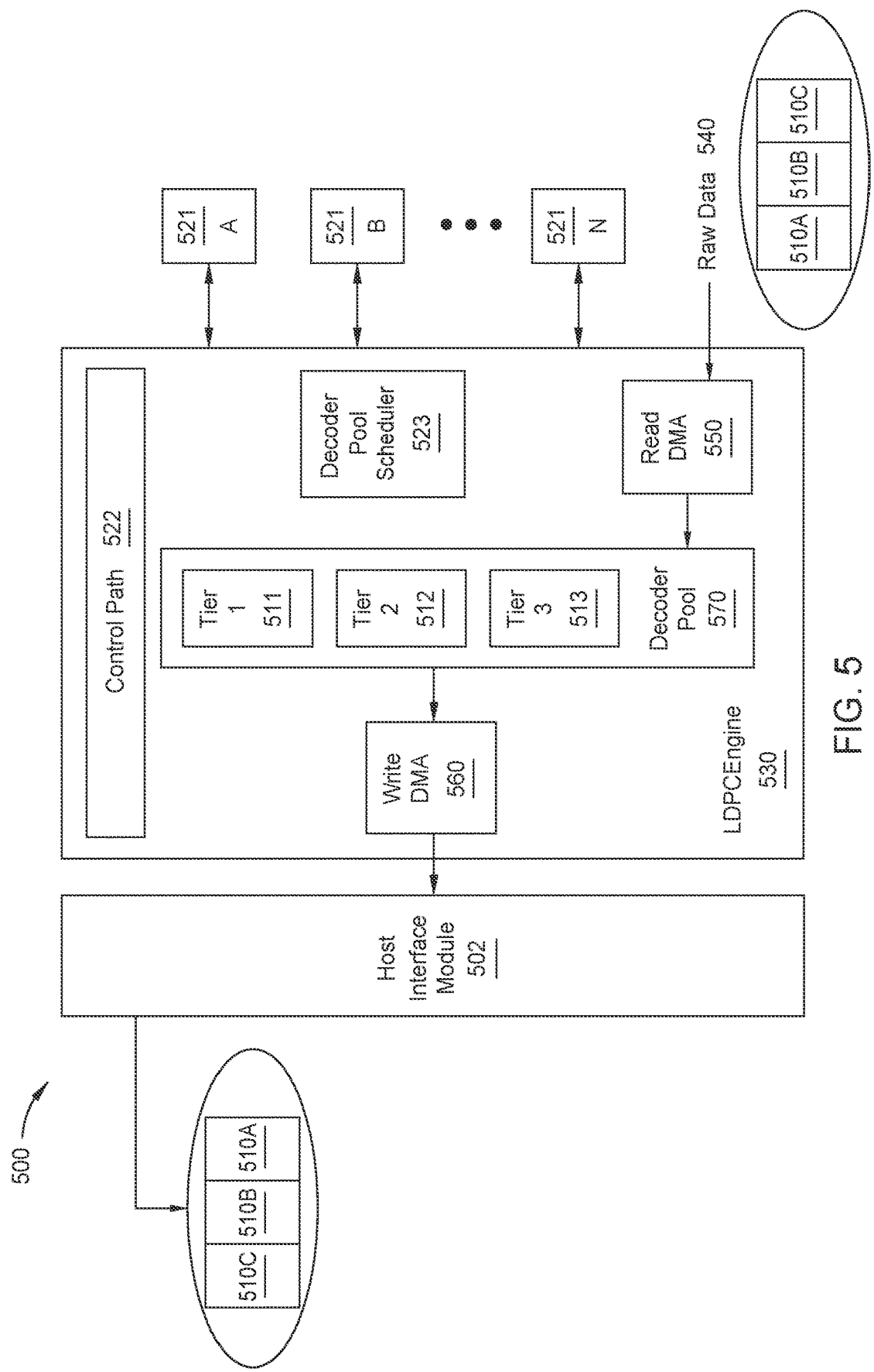
FIG. 5 is a schematic illustration of a read data-path a controller, according to certain embodiments.

FIG. 5 is a schematic illustration of a read data-path 500 of a controller, such as the controller 108 from FIG. 1, according to certain embodiments. The read-data path 500 includes an low-density parity-check (LDPC) engine 530. In one embodiment, the LDPC engine 530 is located in the controller 108. In another embodiment, the LDPC engine 530 is coupled to the controller 108. The LDPC engine 530 is coupled to a host interface module (HIM) 502 and a plurality of flash interface modules (FIMs) 521A-521N.

The HIM 502 may be configured to transfer data to a host device, such as the host device 104, and receive write commands and write data from the host device 104. The plurality of FIMs 521A-521N are configured to interact with a memory device, such as the NVM 110 of FIG. 1. The plurality of FIMs 521A-521N may be arranged as parallel components of the controller 108, such that each FIM is coupled to a respective parallel die group of a plurality of parallel die groups, such as the plurality of die groups 410A-410C.

The LDPC engine 530 includes a control path 522, a write direct memory access (DMA) 560, a decoder pool 570, a decoder pool scheduler 523, and a read DMA 550. The control path 522 may be responsible for generating and scheduling commands to receive data, decode the data, and transfer the data to the HIM 502. The decoder pool scheduler 523 may be configured to determine which tier decoder of the decoder pool 570 to decode raw data 540 retrieved by the read DMA 550.

The raw data 540 may include a bit error rate (BER). The BER may be characterized as a low BER, a medium BER, or a high BER depending on the rate of bit errors. The decoder pool 570 may include one or more decoders, each associated with a decoding tier. For example, the decoder pool 570 includes a tier 1 decoder 511, a tier 2 decoder 512, and a tier 3 decoder 513. The exemplification of the different tiers of decoders is not intended to be limiting, but to provide an example of a possible embodiment. Furthermore, the decoder pool 570 may include one or more decoders of each tier. In addition, the usage of the term "tier" may be utilized as a placeholder for different decoders specialized for different cases. Furthermore, more than or less than the exemplified tiers of decoders are contemplated.

The tier 1 decoder 511 may be utilized for low intensity decoding tasks, such as for low BER data. The tier 2 decoder 512 may be utilized for moderate intensity decoding tasks, such as for medium low BER data. The tier 3 decoder 513 may be utilized for more intensive decoding tasks, such as for high BER data. In other embodiments, the selected decoder may be based on whether the received data exceeds a syndrome weight threshold of the tier 1 decoder 511, the tier 2 decoder 512, or the tier 3 decoder 513. The decoder utilized may be dependent on the decoding operation as well as the current resources utilized, such as current power consumption by the other components of the data storage device. The various decoders may use a tradeoff between latency and power to correction capability, such that the tradeoff is a gear shifting scheme. For example, the tier 1 decoder 511 may be a bit flipping decoder, while the tier 2 decoder 512 and the tier 3 decoder 513 may be message passing decoders. In this context, the tier 2 decoder 512 would be a faster message passing decoder, while the tier 3 decoder 513 would be a stronger message passing decoder.

For example, when a first requested data 510A has a low BER, the first requested data 510A is provided to the tier 1 decoder 511. Likewise, when a second requested data 510B has a medium BER and a third requested data 510C has a high BER, the second requested data 510B is provided to the tier 2 decoder 512 and the third requested data 510C is provided to the tier 3 decoder 513. Because each tier decoder and the number of bit errors may be different per data, the decoding time may vary from data to data and from decoder to decoder.

The processing time of the LDPC engine 530 depends on the current BER. The higher the BER of the data requested, the higher processing latency of the LDPC engine 530. Due to the implementation of several parallel engines in the LDPC engine 530, in-order data transfer execution is not guaranteed. As raw data 540 is decoded in the decoder pool 570, the data may be decoded in-order or out of order. The write DMA 560 transfers the corrected/decoded data to the HIM 502, where the HIM 502 transfers the data to a host device, such as the host device 104 of FIG. 1. The data transferred to the host device 104 may be out of order (e.g., in the order of the third requested data 510C, the second requested data 510B, the first requested data 510A) from the received read command order (e.g., in the order of the first requested data 510A, the second requested data 510B, and the third requested data 510C).

Figure 6:
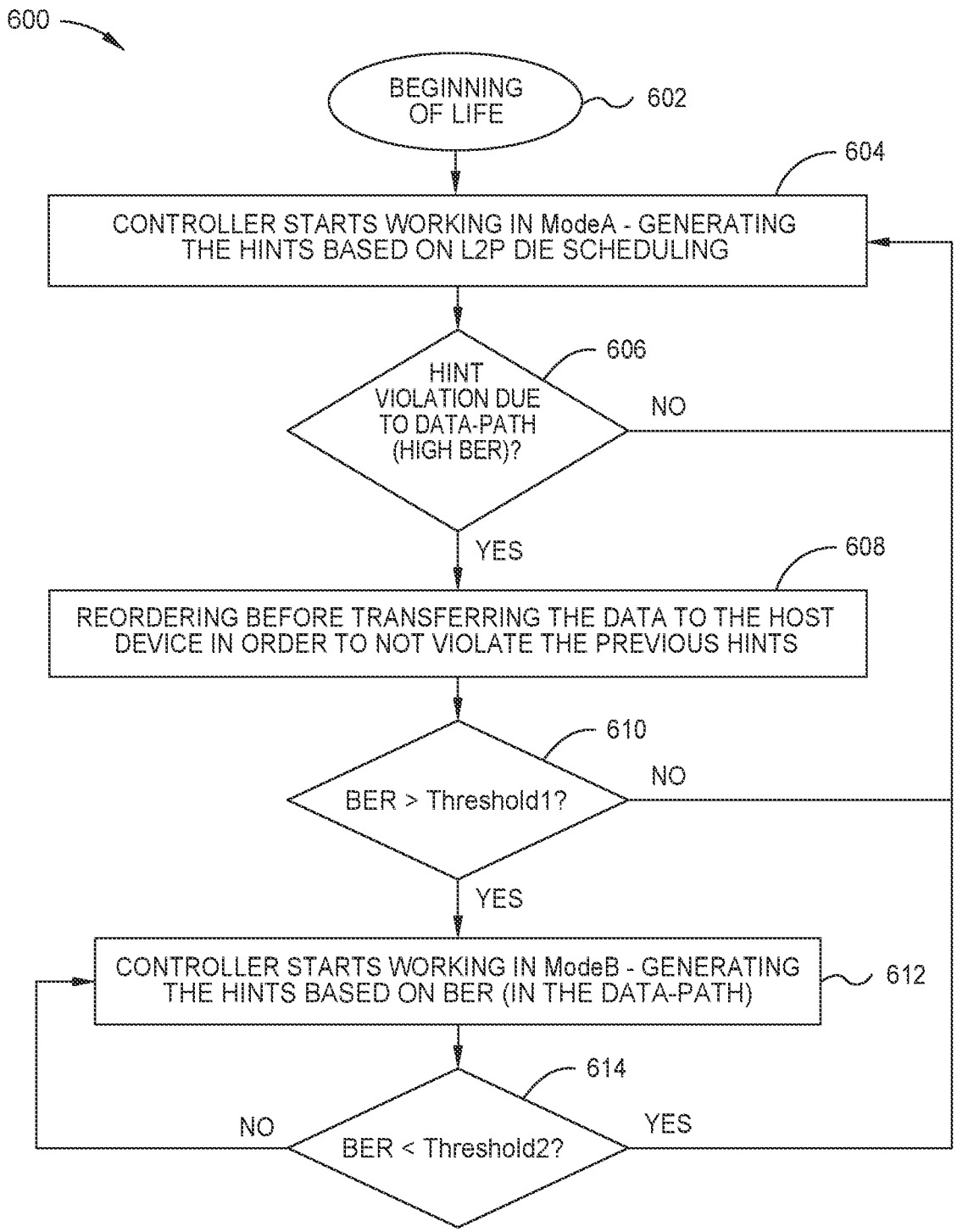
FIG. 6 is a flowchart illustrating a method of switching a controller between supported modes of OOO hint generation, according to certain embodiments.

FIG. 6 is a flowchart illustrating a method 600 of switching a controller, such as the controller 108 from FIG. 1, between supported modes of OOO hint generation, according to certain embodiments. At block 602, the BER of an NVM, such as the NVM 110 of FIG. 1, at the beginning of life (i.e., a new memory device) may be relatively low. When the BER distribution of the memory device is low, OOO data transfers may be rare. More specifically, OOO data transfers due to BER distribution is rare, which is not to be confused with OOO data transfers due to die mapping as OOO data transfers due to die mapping is not rare. Because OOO data transfers are relatively rare at the beginning of life of a data storage device, such as the data storage device 106 of FIG. 1, the controller 108 begins working in ModeA at block 604. ModeA, which may be more accurate when the memory device or the NVM 110 has a low BER, is a mode where the controller 108 generates hints based on an L2P die scheduling or a die mapping due to a fixed order of dies or die qualities (e.g., BER, usage, etc.). The controller 108 logic generates the flow of data through the dies after determining the die mapping and before the request is queued. After the flow of data is interpreted, the relevant hints are generated and provided to a host device, such as the host device 104 of FIG. 1. An advantage of ModeA is that the hint is provided to the host device 104 very early in the read command execution operation.

At block 606, the controller 108 checks for a hint violation due to a data-path. For example, the hint violation may include determining that the received data has a High BER. In another example, the hint violation occurs when the order of the data being decoded is not the same as the order of the data according to the hint provided by ModeA. If no violation due to the data-path is detected at block 606, then the retrieved data is delivered to the host device 104 and the controller 108 continues to operate in ModeA. If a violation due to the data-path is detected at block 606, then the retrieved data must be reordered before the data is transferred to the host device 104 in order to not violate the previously sent hints at block 608. The detection of a violation may include determining that data is sent out of order from the previously sent hints to the host device 104. When reordering, the controller 108 stores the data that is not in order in a buffer, such as the buffer 406 of FIG. 4. The controller 108 then waits for the next data corresponding to the issued hint order to complete its decoding process. When the next data completes the decoding process and is transferred to the host device, the relevant data in the buffer is then transferred so that the relevant data is in order of the previously sent hints.

After the data is reordered and sent to the host device 104, the controller 108 checks the BER of the dies. If the BER of the dies (or each of the dies) does not equal or exceed a first threshold (e.g., Threshold1), then the controller 108 continues to operate in ModeA. If the BER does equal exceed the first threshold at block 610, then the controller 108 begins to operate in ModeB at block 612. In ModeB, the controller 108 generates the hints based on BER of the data in the data-path. ModeB is based on data readiness after LDPC correction. The hints may be generated after error correction processing, which is when the data transfer order is already determined. ModeB is characterized by accurate hints. However, the hints are provided later and may provide the host device 104 with less processing time of the hints. In ModeB, hints are generated after the raw data is decoded and the order of data is known. At block 614, the controller determines if the BER of the dies is below a second threshold (e.g., Threshold2). If the BER is below the second threshold at block 614, then the controller 108 returns back to working in ModeA at block 604. However, if the BER is equal to or above the second threshold at block 614, the controller continues to work in ModeB at block 612.

Figure 7:
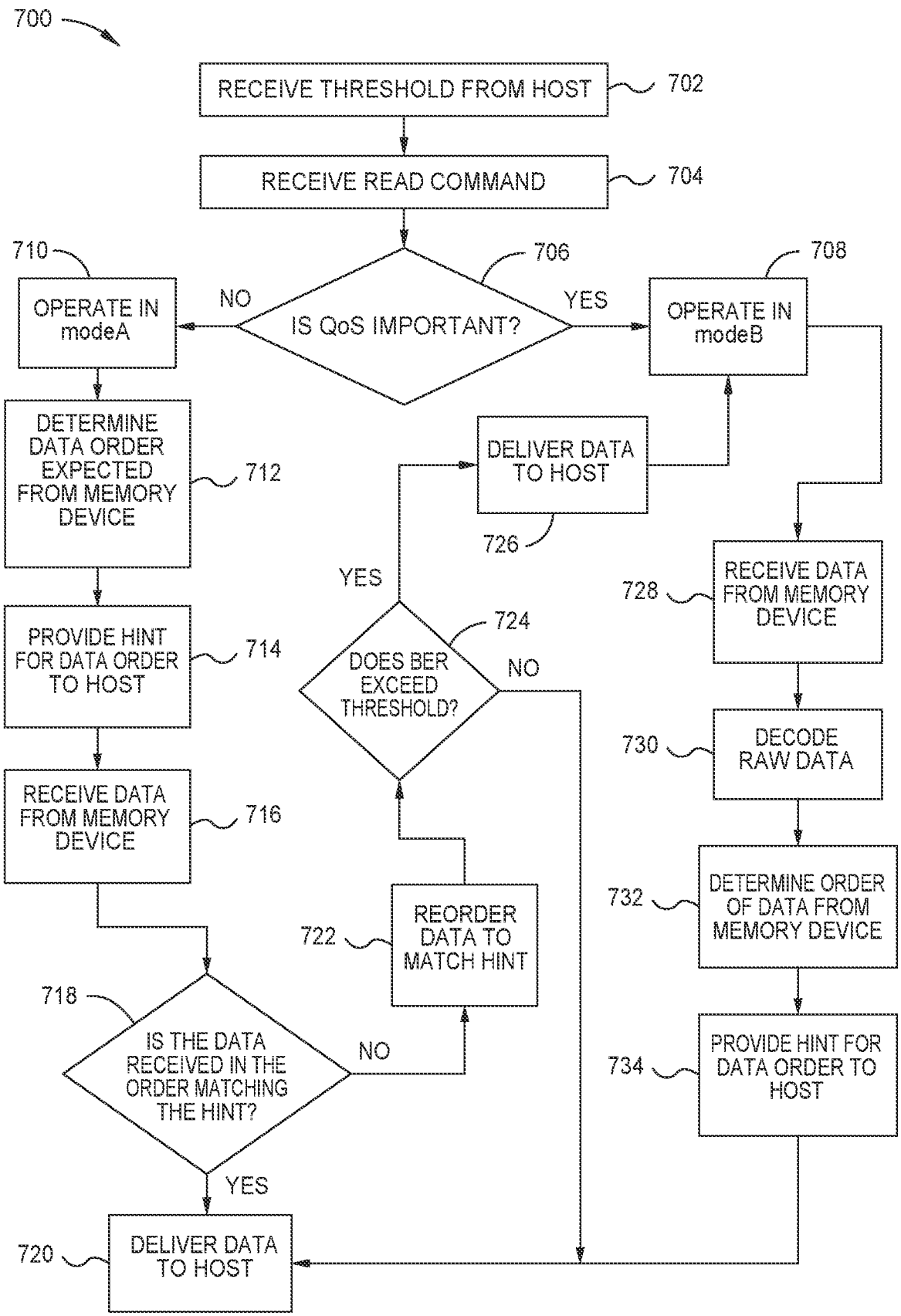
FIG. 7 is a flowchart illustrating a method of switching a controller between supported modes of OOO hint generation with respect to Quality of Service (QoS), according to certain embodiments.

FIG. 7 is a flowchart illustrating a method 700 of switching a controller, such as the controller 108 of FIG. 1, between supported modes of the OOO hint generation with respect to Quality of Service (QoS), according to certain embodiments. At block 702, the controller 108 receives a BER threshold from a host device, such as the host device 104 of FIG. 1. At block 704, the controller 108 receives a read command to obtain data from one or more dies. At block 706, the controller 108 determines if the QoS is to be taken into account or is important. For example, if the read command has a high priority indicator, the QoS is to be taken into account or is determined to be important.

If the QoS is not important at block 706, the controller 108 begins operating in ModeA at block 710. At block 712, the controller 108 determines the data order expected from the relevant memory devices (i.e., the one or more dies), which may be the NVM 110 of FIG. 1, by utilizing the L2P die scheduling and die mapping. At block 714, one or more hints including the data order is provided to the host device 104. Each hint includes a hint data buffer offset and a hint count, where the hint data buffer offset indicates where the data begins and the hint count indicates to the host device 104 the size of the data transfers.

At block 716, the controller 108 receives data, which may be the raw data 540 of FIG. 5, from the one or more memory device. The order of the received data is evaluated when the controller 108 receives the data from the one or more memory devices. At block 718, the controller 108 determines if the order of the received data matches the order of the data provided by the hint to the host device 104. If the order of the data received does match the order of the data provided to the host device 104 by the hint at block 718, then the data is delivered to the host device 104 at block 720. However, if the order of the data received does not match the order of the data provided to the host device 104, then the data must be reordered to match the hint at block 722. A buffer, such as the buffer 406 of FIG. 4, may be utilized to hold one or more pages of data while the controller 108 waits for a different page (i.e., the next page of data corresponding to the hint order) of data to be decoded. After the different page of data is decoded and provided to the host device 104, the first page of data (if the next page of data corresponding to the hint order) may be released from the buffer and the data may be provided to the host device 104 in an order that matches the order provided by the hint.

When the data is reordered to match the hint, the controller 108 determines if different mode of providing hints to the host device 104 would be more beneficial to use. At block 724, the controller 108 evaluates whether the BER exceeds the BER threshold that was received at block 702. The BER is evaluated in order to maintain optimal system performance. For example, when the BER reaches the threshold BER, the processing time of the data transfer may be non-optimal in ModeA. Thus, the controller 108 may switch to operate in ModeB. If the BER does not exceed the BER threshold at block 724, then the data will be delivered to the host device at block 720 and the data transfer will be finished. On the other hand, if the BER does exceed the received BER threshold at block 724, then the data will be delivered to the host device at block 726.

If the QoS is important at block 706 or if the data is delivered to the host device at block 726, then the controller 108 is switched to operate in ModeB at block 708. At block 728, the controller 108 receives data from one or more memory devices. At block 730, the received data, such as the raw data 540 of FIG. 5, is decoded. At block 732, the order of data received from the one or more memory devices is determined. At block 734, one or more hints of the data order is provided to the host device 104. After providing the one or more hints to the host device at block 734, the data is delivered to the host device 104 at block 720. The behavior of sending the hints after the data has been decoded benefits the performance of the system when there is a high BER. When the relevant data includes a high BER, the performance of the data storage device is reduced and providing hints late may not affect the overall performance of the data storage device.

The OOO hint generator works in several modes depending on the state of the NVM 110 or memory device. When the NVM 110 or memory device is new, the BER is very low, and therefore, a valid assumption is that a data transfer will very rarely initiate OOO. As the NVM 110 or memory device approaches the end of its life, the assumption is invalid as the processing time of the LDPC engine may depend on the current BER of the NVM 110 or the memory device. Thus, a data transfer of a low BER task may bypass a data transfer of a high BER task. When having low BER, the OOO hints are generated in ModeA, which may be more accurate than generating hints in ModeB. In ModeA, the hints are generated early enough and provided to the host device 104, so that the host device 104 may have enough time to process the hints. When detecting that the NVM or the memory devices has a high BER, the controller 108 switches to ModeB. ModeB generates the hints after the raw data is decoded and the order is known. When operating in ModeB, hints are delivered late in the read command execution operation and the host device 104 may receive less time to process the received hints. However, ModeB may be more accurate than ModeA.

Two main factors drive the OOO in a NAND based device. The first reason is related to the multiple dies implemented in a single storage device. In eSSD, the number of dies could be 512 or even 1024. These values are not meant to be limiting of the disclosure. Even in a single die system, the data storage device 106 may prefer to transfer the data OOO due to the high BER in a specific page or a specific memory device. Other pages may be transferred to the host before the page with high BER.

By generating accurate OOO hints and sending the OOO hints to the host device, the performance of the data storage device may be improved.

In one embodiment, a data storage device includes a memory device and a controller coupled to the memory device. The controller is configured to interact with a host device using UFS interface protocols and to operate in a first mode corresponding to a first bit error rate (BER) and a second mode corresponding to a second BER that is greater than the first BER. The controller is configured to operate in the first mode and provide a hint to the host device. The hint includes an indication of what order data will be received from the data storage device. The order of the data will be a different order than a requested order. After providing the hint, the controller is configured to retrieve the data from the memory device. The controller detects a hint violation due to BER, reorders the data to match the order provided in the hint, and delivers the data to the host device. The controller then determines that the BER is greater than a predetermined threshold and switches to operation in the second mode.

The controller is further configured to determine an availability of memory dies of the memory device prior to providing the hint. The hint is based upon the determined availability of the memory dies. The controller is further configured to configured to switch back to operation in the first mode upon determining the BER is below the threshold. The controller stores the data that is out of order from the hint in a buffer prior the reordering. The data is decoded prior to sending to the host device. The hint takes into account logic to physical (L2P) address translation and memory die mapping.

In another embodiment, a data storage device includes a memory device and a controller coupled to the memory device. The controller is configured to interact with a host device using UFS interface protocols and to operate in a first mode corresponding to a first bit error rate (BER) and a second mode corresponding to a second BER that is greater than the first BER. The controller is configured to operate in the second mode and retrieve data from the memory device. After retrieving the data, the controller is configured to provide a hint to the host device. The hint includes an indication of what order data will be received from the data storage device. The order of the data will be in a different order than a requested order. The controller is configured to deliver the data to the host device. The controller is also configured to compare a BER for the delivered data to a threshold, determine the BER is less than the threshold, and switch to operation in the first mode.

The controller is configured to determine a bit error rate for the data retrieved from each die of the memory device. The first mode comprises delivering a hint to the host device prior to retrieving the data. During operation in the second mode, the data retrieved from the memory device is sent to a decoder, wherein the data is decoded, and wherein any data that needs corrected is corrected prior to providing the hint. The data emerges from the decoder in a different order than the data was delivered to the decoder. The hint is embedded in a UFS packet sent to the host device.

In another embodiment, a data storage device includes memory means and a controller coupled to the memory means. The controller is configured to interact with a host device using UFS interface protocols. The controller is configured to provide a hint to the host device, switch between a first mode and a second mode, and deliver the data to the host device. The hint includes an indication of what order data will be received from the data storage device. The order of the data will be in a different order than a requested order. The first mode includes providing the hint prior to retrieving the data from the memory means. The second mode includes providing the hint after retrieving the data from the memory means.

The controller is configured to operate in the first mode and switch to the second mode upon determining the data has exceeded a bit error rate threshold. The controller is configured to switch back to the first mode upon determining the data is below a bit error rate threshold. The controller is configured to reorder data received from the memory means to match an order of the hint delivered to the host device. The controller switches to the second mode after delivering requested data to the host device. The hint is based upon logical block array ranges. The hint is based upon obtaining a predetermined quality of service (QoS) threshold.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to interact with a host device using Universal Flash Storage (UFS) interface protocols, and to operate in a first mode corresponding to a first bit error rate (BER) and a second mode corresponding to a second BER that is greater than the first BER, wherein the controller is further configured to:
   operate in the first mode;
   provide a hint to the host device, wherein the hint comprises an indication of what order data will be received from the data storage device, wherein the order of the data will be in a different order than a requested order;
   after providing the hint, retrieve the data from the memory device;
   detect a hint violation due to BER;
   reorder the data to match the order provided in the hint;
   deliver the data to the host device;
   determine that the BER is greater than a predetermine threshold; and
   switch to operation in the second mode.

2. The data storage device of claim 1, wherein the controller is further configured to determine an availability of memory dies of the memory device prior to providing the hint.

3. The data storage device of claim 2, wherein the hint is based upon the determined availability of the memory dies.

4. The data storage device of claim 1, wherein the controller is configured to switch back to operation in the first mode upon determining the BER is below the threshold.

5. The data storage device of claim 4, wherein the controller stores the data that is out of order from the hint in a buffer prior to the reordering.

6. The data storage device of claim 1, wherein the data is decoded prior to sending to the host device.

7. The data storage device of claim 1, wherein the hint takes into account logic to physical address translation and memory die mapping.

8. A data storage device, comprising:
   a memory device; and
   a controller coupled to the memory device, wherein the controller is configured to interact with a host device using Universal Flash Storage (UFS) interface protocols, and to operate in a first mode corresponding to a first bit error rate (BER) and a second mode corresponding to a second BER that is greater than the first BER, wherein the controller is configured to:
   operate in the second mode;
   retrieve data from the memory device;
   after retrieving the data, provide a hint to the host device, wherein the hint comprises an indication of what order data will be received from the data storage device, wherein the order of the data will be in a different order than a requested order;
   deliver the data to the host device;
   compare a BER for the delivered data to a threshold;
   determine the BER is less than the threshold; and
   switch to operation in the first mode.

9. The data storage device of claim 8, wherein the controller is configured to determine a bit error rate for the data retrieved from each die of the memory device.

10. The data storage device of claim 9, wherein the first mode comprises delivering a hint to the host device prior to retrieving the data.

11. The data storage device of claim 8, wherein during operation in the second mode, the data retrieved from the memory device is sent to a decoder, wherein the data is decoded, and wherein any data that needs corrected is corrected prior to providing the hint.

12. The data storage device of claim 11, wherein data emerges from the decoder in a different order than the data was delivered to the decoder.

13. The data storage device of claim 8, wherein the hint is embedded in a UFS packet sent to the host device.

14. A data storage device, comprising:
    memory means; and
    a controller coupled to the memory means, wherein the controller is configured to interact with a host device using Universal Flash Storage (UFS) interface protocols, wherein the controller is configured to:
        provide a hint to the host device, wherein the hint comprises an indication of what order data will be received from the data storage device, wherein the order of the data will be in a different order than a requested order;
        switch between a first mode and a second mode, wherein the first mode comprises providing the hint prior to retrieving the data from the memory means, and wherein the second mode comprises providing the hint after retrieving the data from the memory means; and
        deliver the data to the host device.

15. The data storage device of claim 14, wherein the controller is configured to operate in the first mode and switch to the second mode upon determining the data has exceeded a bit error rate threshold.

16. The data storage device of claim 15, wherein the controller is configured to switch back to the first mode upon determining the data is below a bit error rate threshold.

17. The data storage device of claim 14, wherein the controller is configured to reorder data received from the memory means to match an order of the hint delivered to the host device.

18. The data storage device of claim 14, wherein the controller switches to the second mode after delivering requested data to the host device.

19. The data storage device of claim 14, wherein the hint is based upon logical block array ranges.

20. The data storage device of claim 14, wherein the hint is based upon obtaining a predetermined quality of service (QoS) threshold.

* * * * *